Sept. 10, 1929.   L. S. FORD   1,727,972
ELECTRICAL CABLE
Filed April 18, 1924   2 Sheets-Sheet 1
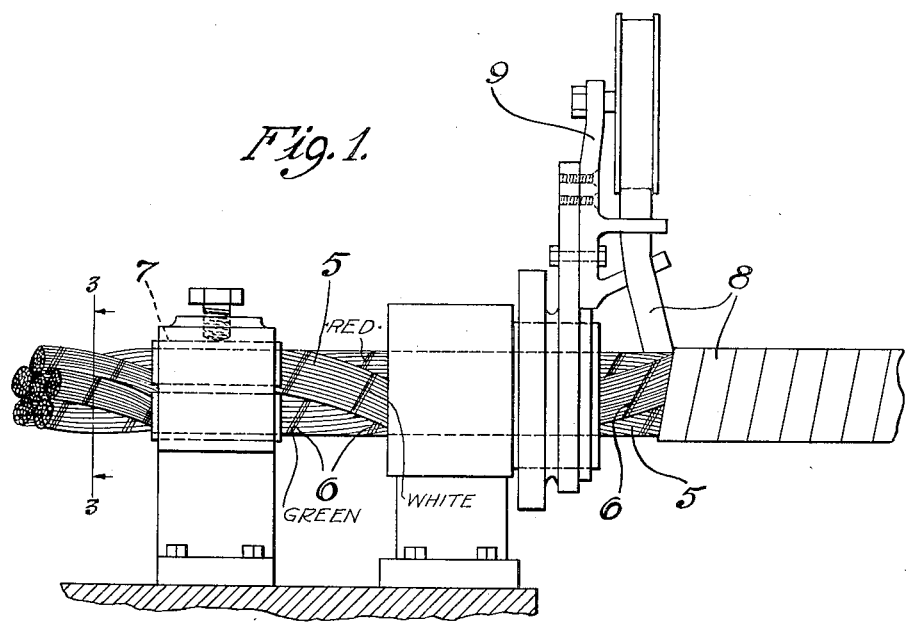
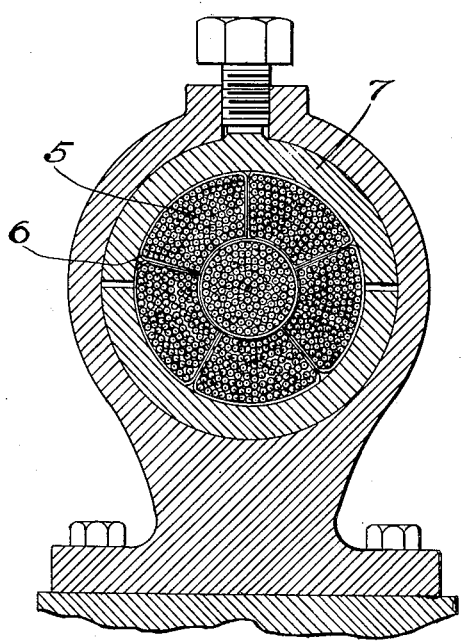
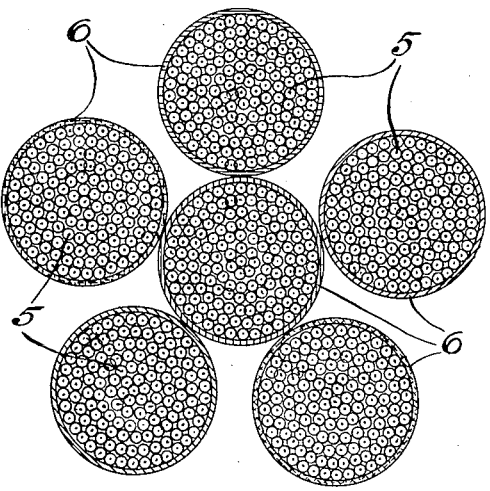
Inventor
Leroy S. Ford
by H.A.Pattison
Atty.

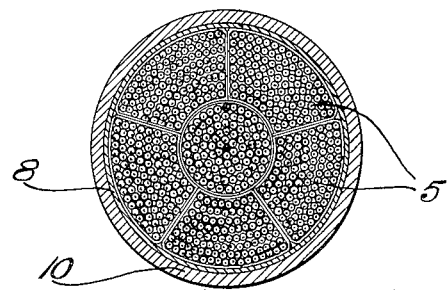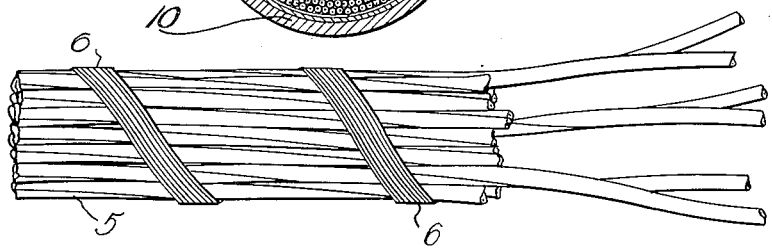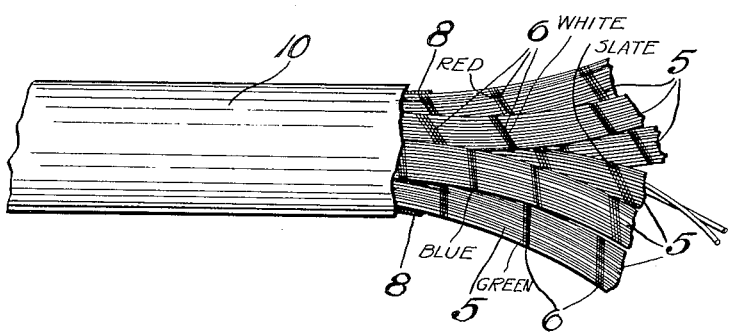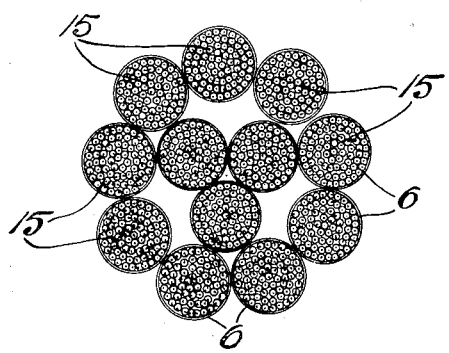

Patented Sept. 10, 1929.

1,727,972

UNITED STATES PATENT OFFICE.

LEROY STEARNS FORD, OF RIVER FOREST, ILLINOIS, ASSIGNOR TO WESTERN ELECTRIC COMPANY, INCORPORATED, OF NEW YORK, N. Y., A CORPORATION OF NEW YORK.

ELECTRICAL CABLE.

Application filed April 18, 1924. Serial No. 707,528.

This invention relates to improvements in electrical cables, particularly to the type employed for telephonic communication.

Subscribers in city districts are, in the modern telephone plant, connected to the central office through lead covered cables of either the aerial or underground type. In a typical connection the subscriber's telephone set is connected by means of a twisted pair of rubber insulated drop wires with a sealed chamber type of terminal located near the subscriber's house. The sealed chamber is provided with means for connecting several subscribers' pairs to it. From these terminals, connection is made to the main underground or aerial cable system by means of small lead covered cables known as "block" cables. A number of these block cables bridge into the main aerial or underground cable which enters the central office. The block and main aerial or underground cables are of the paper insulated, dry core, lead covered type. At the central office it is necessary to connect the paper insulated conductor wires of the main cable with wires suitably insulated with silk, cotton, wool, or some other suitable insulating material so that they may be handled in connecting them to the terminals on what is termed a "main frame" located in the central office. These connecting cables between the paper insulated underground cable and the main frame are known as tips or terminating cables. The larger aerial or underground paper insulated cables connecting the subscriber to the central office consist of a large number of lines ranging from 606 to 1212 actual pairs.

It is necessary, of course, to know each subscriber's number at the central office. It would be impractical to attempt to associate these large subscriber cables each pair with its terminal number on the "main frame" throughout the entire circuit length by means of identification marks or colors. As a consequence the pairs in all of these large cables are separated into groups of pairs by definite color combinations. For instance, a 606 pair paper cable has six distinct color groups of 101 pairs each. Starting at the center, a core is formed of the first 101 pairs, one conductor of each pair being insulated with one color of paper and the other conductor of a pair being insulated with a different color, as, for instance, one wire having an insulation of white paper and the other wire of red paper. Around this central core of red and white pairs are stranded in concentric layers a second group which may be colored blue and white. A third group may be colored orange and white, etc. As the factory lengths of such cables are joined together in the field, like color groups are always spliced together so that from end to end of long cables the pairs are definitely separated into finite groups. Each group is given a definite group of pair numbers as, for instance, the red-white group is given numbers from 1 to 101 inclusive, the blue-white group 102 to 202 inclusive, etc., and in locating an individual pair it is only necessary to ring out the pairs of the group in which the sought number is located.

With the type of subscribers' paper insulated cable above described the groups are arranged in concentric layers, and since each layer or series of layers constituting a group does not always contain the proper number of pairs to complete a layer, a layer may contain the last pairs of one group and the first pairs of the next group. As a consequence, although the individual subscriber's lines are arranged in groups in the cable, these groups are not entirely separate and to this extent are not always well defined. Furthermore, in order to collect like colored pairs into a unit group or bunch, it is necessary, except for the central group, to divide the layers and pass the pairs around the central core to one side of the cable, resulting in an unhandy and awkward arrangement in splicing and terminating the cable.

An object of this invention is to provide a cable, particularly of the type employed for telephonic communication, consisting of a plurality of pairs similar in appearance of individually insulated conductors arranged in well defined and distinguished groups, the insulation of conductors in adjacent groups being in contact.

Another object of the invention is to provide a cable of the above described type, so constructed that when it is enclosed in a protective sheath practically all of the space within the sheath is utilized by the insulated conductors.

Other objects and advantages of the invention will more fully appear from the following detailed description and will be particularly pointed out in the appended claims.

In the accompanying drawings:

Fig. 1 is a schematic side elevation of part of an apparatus for making the improved form of cable;

Fig. 2 is an enlarged vertical sectional view of the die for compressing the groups of conductors so that the cable presents a substantially cylindrical exterior;

Fig. 3 is an enlarged vertical sectional view taken on the line 3—3 of Fig. 1;

Fig. 4 is a vertical sectional view of a cable made in accordance with the invention;

Fig. 5 is a fragmentary side elevation thereof;

Fig. 6 is a schematic vertical sectional view of a modified form of cable made in accordance with the invention; and Fig. 7 is an enlarged view of one of the groups of conductors constituting the cable showing that the individual conductors are twisted into pairs.

The improved type of cable and method of making the same disclosed in this application is a modification of the cable and method of producing it disclosed in co-pending application, Serial No. 677,873, filed November 30, 1923. In the co-pending application just mentioned, although the conductors are arranged in groups, the color scheme of each group is different from the insulation color scheme of adjacent groups; whereas in the cable and method of producing it constituting the present invention the insulation color scheme of all the groups is the same, means being provided for differentiating each group from the adjacent groups.

It is believed that the construction of the improved form of cable will be understood by a description of the method of making the same.

A plurality of copper wires insulated with paper, cotton, silk, or other suitable material, usually twisted together in pairs, are stranded together loosely to form a group or bundle 5 of conductors which are held together in their loosely stranded condition by means of a suitable strand binder 6 of cotton or other suitable material. The binder 6 is wrapped in a helix the turns of which are spaced widely apart as illustrated in Figs. 5 and 7. The group or bundle 5 may be formed in any suitable manner but preferably by the usual and well-known form of strander in which, when the cable is used for telephonic communication the conductors are stranded in oppositely laid layers to eliminate cross talk.

In the formation of a cable, a plurality of groups 5 are formed in the manner above described and then stranded together to have the form shown in Fig. 3. Any suitable type of strander may be used, such as those employed in the stranding of rope, the construction and operation of which are well known to those skilled in the art.

The insulation color scheme of each twisted pair of conductors is such that the conductors may be distinguished from each other; that is, one conductor of a pair may be white and the other red, or colored in any suitable manner to differentiate them from each other. The twisted pairs in all of the groups may or may not have the same color scheme, as desired, since means is provided for differentiating one group of conductors from adjacent groups irrespective of the insulation color scheme of the group, said insulation color scheme only being necessary to differentiate the conductors constituting the pair. The means for distinguishing one group of conductors from the adjacent groups comprises the strand wrapping 6 which is of a different color on each group of conductors. Thus one group may have a red strand wrapping, another white, another blue, another orange, etc., the groups being so arranged that the strand wrapping of one group is different color from the strand wrapping of adjacent groups. Instead of having the strand wrappings of different colors, any suitable retaining means having different distinctive appearances may be employed.

Means is provided for compressing the groups as shown in Fig. 3 into the form shown in Fig. 4 and for retaining the groups 5 in the latter formation. This means comprises a cylindrical die 7 through which the stranded cable is pulled, the die serving to compress the groups 5 into a cylindrical composite which is retained in this form by means of a paper wrapping 8 which may be applied by a usual form of tape serving head 9. The die 7 and serving head 9 are, for economy, preferably mounted on the machine which strands the groups 5 together.

The keystoning of the groups into a cylindrical composite as shown in Fig. 4 is only possible due to the fact that each group 5 is loosely stranded prior to the assembly of these groups to form the complete cable, and that the binding 6 of each group is wrapped in an open spiral of long lay, so as not to restrict the readjustment of the pairs as the units are cabled together.

Instead of making a cable with the "lay up" illustrated in Fig. 4 in which five groups 5 are arranged around a central group, the cable may be designed as shown in Fig. 6.

In this "lay up" three groups 15 are arranged at the center constituting a core around which nine groups 15 are stranded. After the cable has been passed through the apparatus shown in Figs. 1 and 2, the loosely stranded groups 15 assume a shape in which the three central groups 15 are compressed into sector shapes while the nine groups arranged therearound are given a shape which may be defined as a "sector shape" for want of a better descriptive term.

Where the cable is used for telephonic communication it is usually enclosed within a protective lead sheath 10.

By referring to Figs. 4 and 6 it will be apparent that each group 5 or 15 is, in effect, a separate small cable and due to the color scheme employed for the strand wrapping 6 of each group, they are clearly defined and readily distinguishable from each other. Furthermore, although the groups are readily distinguishable, they are in close association, the insulation of the outer conductors of each group exposed between the helical turns of the strand binder 6 being in actual engagement with the insulation of the outer conductors of adjacent groups and substantially all of the space within the lead sheath is utilized by the individually insulated conductors.

What is claimed is:

1. In a cable for the transmission of intelligence electrically, a plurality of insulated conductors arranged in pairs occupying substantially the same relative positions throughout their length, the insulation of the individual conductors forming each pair differing in color and the colors of all pairs being alike, the pairs held together on groups solely by a plurality of textile strands applied therearound in open spiral formation to permit the inter-engagement of the insulation of conductors in adjacent groups, and the strands surrounding adjacent groups differing in color.

2. In a cable for the transmission of intelligence electrically, a plurality of individually insulated conductors twisted into pairs, said pairs being substantially parallel to each other throughout their length and arranged in separate and distinct groups, the insulation of all of the pairs of the conductors in the groups being similar in appearance, and distinctively and characteristically different means individual to each group serving as a sole retaining means for the groups of conductors and permitting ready and easy identification of the groups one from another and the separation of the conductors within the groups.

3. In a cable for the transmission of intelligence electrically, a plurality of insulated conductors arranged in twisted pairs, the conductors forming each pair being distinctive in appearance from each other, said pairs being substantially parallel to each other throughout their length and arranged in separate and distinct groups, and distinctively and characteristically different strand binding elements individual to each group serving as a sole retaining means for the groups of conductors and permitting ready and easy identification of the groups one from another and the separation of the conductors within the groups.

In witness whereof, I hereunto subscribe my name this 7th day of April, A. D. 1924.

LEROY STEARNS FORD.